Patented Mar. 9, 1948

2,437,538

UNITED STATES PATENT OFFICE 2,437,538

RUBBER COMPOSITIONS CONTAINING OCTADECANE NITRILE

John H. Kelly, Jr., Oak Park, Ill., assignor to Dryden Rubber Company, Chicago, Ill., a corporation of Illinois No Drawing. Application May 27, 1943,
Serial No. 488,694

3 Claims. (Cl. 260—5)

The invention relates to oil resistant rubber compositions and to methods of making the same.

One object of the invention is to provide an oil resistant reclaimed rubber composition.

Another object is to provide an oil resistant extender for synthetic rubber-like copolymers of butadiene acrylonitrile and for the various other oil resistant rubber polymers derived from the polymerization of dienes in general.

Other objects of the invention will become apparent as the following detailed description progresses.

In accordance with one embodiment of the invention, waste vulcanized rubber, such as automobile tires, waste moulded mechanical scrap, inner tubes, or other scrap is suitably regenerated or reclaimed by methods well known to the art. The process of reclaiming may be either the well known alkali process or else the heater process wherein the scrap is subjected to simple live steam devulcanization. These reclaims are used as a base for building up oil resisting compositions. When suitably compounded with octadecane nitrile, sulfur and a di- or tri-substituted aryl guanidine, and preferably magnesium oxide or other alkaline earth oxide, these compositions after vulcanization reveal unusually good oil resistance, and in addition are characterized by excellent tensiles, elongation and elasticity in themselves. If these compositions are blended with oil resisting synthetic rubber-like products such as the butadiene acrylonitrile copolymers, it is found they act as very good and inexpensive oil resistant extenders of the synthetic copolymer. As will be revealed, the use of these extenders does not lower the inherent oil resistance of these copolymers to any marked extent.

Another embodiment of this invention consists of utilizing crude rubber instead of reclaim. If compounded as with the reclaims by suitable amounts of the alkyl nitrile, alkaline earth oxide, sulfur and a substituted guanidine, the crude rubber composition has also proved utilizable with the synthetic copolymers. Oil resistant properties are again evident in the compositions as revealed in the examples submitted hereafter.

In my invention, I prefer to use a reclaimed rubber. It is considerably more economical and confers better processing characteristics upon the butadiene acrylonitrile or other copolymers. Milling, calendering or extrusion characteristics are greatly improved and the usual processing difficulties minimized.

While these compounds may be used by themselves as inexpensive oil resistant compounds, greater utility is found as extenders for synthetic rubber. After vulcanization, essentially similar oil resistant properties are found. It is contemplated that these extenders can be used with the various rubber-like polymers such as polychloroprene, butyl rubbers and the like. However, it has given particularly satisfactory results with the butadiene acrylonitrile copolymers.

In building up these oil resistant compositions the proportions of the various ingredients vary. Preferably the sulfur constituent of the compound is kept in excess of 20% by weight on the rubber hydrocarbon itself or else on the rubber hydrocarbon value of the reclaim. The substituted aryl guanidine is preferably present in the ratio of three to five molecular equivalents by weight on the sulfur. Suitable proportions of the octadecane nitrile are usually from 15% to 50% or more of the hydrocarbon value of the extender.

As an example, utilizing a low grade molded mechanical reclaim containing 40% rubber hydrocarbon value and derived from molded scrap by the heater process and which possesses these physical characteristics after the 5% sulfur cure,

| | |
|---|---|
| Hardness | 58 |
| Tensile | 395 |
| Elongation percent | 260 |
| Ash do | 21.89 |
| Acetone extract do | 16.46 |
| Rubber hydrocarbon content do | 40.12 | the following is submitted:

EXAMPLE I

A reclaimed rubber composition suitable as an oil resistant composition by itself or else as an extender for butadiene acrylonitrile copolymers was compounded as follows, using the molded black scrap heater process reclaim as a base.

Reclaim extender "A"

| | |
|---|---|
| Molded mechanical reclaim | 25.0000 |
| Magnesium oxide | .4375 |
| Triphenyl guanidine | 5.2500 |
| Sulfur | 2.3125 |
| Antioxidant | .7500 |
| Octadecane nitrile | 1.8750 |

In preparing this composition the ingredients were added to the reclaim in the usual way on the mill or else in the banbury. After sheeting off, the composition was delivered to refining rolls set from .005" to .007" and slabbed off on windup roll as normally practised in finishing reclaims. Thereupon the above composition was milled with a butadiene acrylonitrile copolymer to give the following composition:

| | |
|---|---|
| Butadiene acrylonitrile copolymer synthetic rubber | 100 |
| Soft coal tar (140° F. M. P.) | 3 |
| Channel black | 75 |
| Zinc oxide | 10 |
| Trimethyldihydroquinoline | 1 |
| Benzothiazyl disulfide | 1 |
| Reclaim extended "A" | 300 |
| Octadecane nitrile | 50 |

The above product, press cured in ⅛" slabs 2" x 8" at 330° for 45 minutes, gave excellent oil resistance. Three hours immersion in hot kerosene at 70° F. evidenced less than 2½% increase in weight and less than 5% increase in volume.

EXAMPLE II

In order to determine the influence of ordinary reclaims as a factor in creating oil resistance with the reclaim extender "A" as shown in Example I, and to compare oil resistance of an untreated reclaim versus this compounded reclaim extender, the following examples are submitted illustrating the procedures involved. In these examples the reclaims, both the uncompounded reclaim of the extender and the reclaim selected for comparison, were first sheeted out on a mill and then added to the butadiene acrylonitrile copolymer on the mixing mill, followed by the compounding ingredients. This procedure gave a more uniform and advantageous comparison on each batch, and in addition illustrates the basic advantage of the invention.

| | "A" | "B" |
|---|---|---|
| Butadiene acrylonitrile copolymer synthetic rubber | 100.00 | 100.00 |
| Soft coal tar 140° F. M. P. | 3.00 | 3.00 |
| Zinc oxide | 10.00 | 10.00 |
| Benzothiazyl disulfide | 1.50 | 1.50 |
| Semi-reinforcing black | 30.00 | 75.00 |
| Trimethyl dihydroquinoline | 1.00 | 1.00 |
| Octadecane nitrile | 50.00 | 50.00 |
| Untreated molded mechanical reclaim | 70.00 | 70.00 |
| Triphenyl guanidine | | 14.50 |
| Sulfur | | 6.40 |
| Light calcined magnesium oxide | | 1.10 |
| Antioxidant | | 2.10 |
| Octadecane nitrile | | 5.20 |

In mixing, the ingredients of compound "B" were added to the butadiene acrylonitrile copolymer synthetic rubber ingredients, including the octadecane nitrile, which was added last as in ordinary mixing procedures involving the plasticizers.

Press cured slabs 2" x 8", 45 minutes at 330° F. resulted in the following comparison:

| | Hardness | Tensile | Percent change in— | | |
|---|---|---|---|---|---|
| | | | Elongation | Weight | Volume |
| HOT KEROSENE IMMERSION, 48 HOURS AT 100° C. | | | | | |
| "A" | 35 | 380 | 570 | +15.7 | +22.7 |
| "B" | 55 | 860 | 240 | −4.4 | −4.7 |
| "PPF" IMMERSION, 48 HOURS AT ROOM TEMPERATURE | | | | | |
| "A" | 40 | 810 | 750 | +34.7 | +50.8 |
| "B" | 50 | 730 | 250 | +3.2 | +9.6 |

The PPF fuel admixture consisted of a mixture of 65 octane gasoline 60%, benzol 5%, toluol 20%, and xylol 15%.

It will be observed the extender is markedly superior to ordinary reclaimed rubber in butadiene acrylonitrile copolymer compounds. In addition, variation of the mixing procedure to produce the extender in situ instead of producing the extender composition first and then blending into the polymer does not markedly affect the oil resistance.

EXAMPLE III

The use of a standard whole tire alkali process reclaim is given below as an example illustrating the range of this invention. This reclaim, vulcanized 20 minutes at 287° F. after the usual 5% sulfur addition possesses the following physical characteristics:

| | |
|---|---|
| Hardness | 40 |
| Tensile | 718 |
| Elongation per cent | 395 |
| Specific gravity (corrected) | 1.18 |
| Acetone extract per cent | 9.21 |
| Ash do | 16.00 |
| Rubber hydrocarbon value by difference per cent | 58.16 |

Compounding in accordance with the principle of establishing at least a minimum of 20% sulfur on the hydrocarbon value of this reclaim, the following composition was produced:

Reclaim extender "B"

| | |
|---|---|
| Whole tire reclaim | 100 |
| Triphenylguanidine | 30.9 |
| Sulfur | 13.8 |
| Magnesium oxide | 2.4 |
| Antioxidant | 4.5 |
| Octadecane nitrile | 11.25 |

This extender was refined and slabbed off at the usual refining gauge of .005" to .007" and then mixed with a butadiene acrylonitrile copolymer as shown below:

| | |
|---|---|
| Butadiene acrylonitrile copolymer synthetic rubber | 100 |
| Soft coal tar (140° F. M. P.) | 3 |
| Zinc oxide | 10 |
| Sulfur | 1 |
| Benzothiazyl disulfide | 1 |
| Trimethyl dihydroquinoline | 1 |
| Channel black | 75 |
| Reclaim extender "B" | 150 |
| Octadecane nitrile | 50 |

After vulcanizing the 2" x 8" slabs 45 min. at 330° F. the resistance to hot kerosene is easily witnessed in the following comparison:

| | Hardness | Tensile | Elongation | Recovery | Percent change | |
|---|---|---|---|---|---|---|
| | | | | | Weight | Volume |
| Original | 55 | 950 | 280 | 103 | | |
| Kerosene, after 3 hrs. at 70° C. | 55 | 940 | 250 | 106 | 1.2 | 3.3 |

The resistance to various other solvent compositions is excellent.

EXAMPLE IV

In illustrating the use of ordinary crude rubber compounded to give a similar hydrocarbon value content, 40%, as existing in the reclaim constituent of reclaim extender "A" in Example I, the following is submitted.

*Crude rubber extender "C"*

| | |
|---|---|
| No. 1 smoked sheet | 100.00 |
| Thermatomic soft black | 145.00 |
| Zinc oxide | 5.00 |
| Stearic acid | 2.00 |
| Triphenyl guanidine | 50.00 |
| Light magnesium oxide | 4.00 |
| Sulfur | 23.70 |
| Octadecane nitrile | 18.75 |

As shown by the above example the rubber is 28.7% by weight of the composition, and the sulfur is 23.7% by weight of the rubber.

Milling was followed as in accepted procedures known to the art, and the compound slabbed off.

In comparing the use of crude rubber extenders against a typical reclaim extender, the following is given:

| | "A" | "B" |
|---|---|---|
| Butadiene acrylonitrile copolymer synthetic rubber | 100.00 | 100.00 |
| Soft coal tar (140° F. M. P.) | 3.00 | 3.00 |
| Semi-reinforcing black | 75.00 | 75.00 |
| Zinc oxide | 10.00 | 10.00 |
| Benzothiazyl disulfide | 1.50 | 1.50 |
| Sulfur | 2.50 | 2.50 |
| Crude rubber extender "C" | 100.00 | |
| Reclaim extender "A" | | 100.00 |
| Octadecane nitrile | 50.00 | 50.00 |

The above compositions were press cured for 45 minutes at 331° F., ⅛" slabs, and results of tests are shown in the following table:

| | Hardness | Tensile | Elongation | Recovery | Percent change | |
|---|---|---|---|---|---|---|
| | | | | | Weight | Volume |
| Originals: | | | | | | |
| "A" | 45 | 890 | 320 | 106 | | |
| "B" | 47 | 910 | 330 | 106 | | |
| 48 hours, Kerosene, 100° C.: | | | | | | |
| "A" | 60 | 710 | 220 | 106 | −1.6 | +0.21 |
| "B" | 55 | 860 | 240 | 103 | −4.4 | −4.7 |
| 48 hours aromatic fuel at room temp.: | | | | | | |
| "A" | 60 | 850 | 250 | 106 | +14.8 | +23.1 |
| "B" | 50 | 730 | 250 | 103 | +3.2 | +9.6 |

The value of crude rubber is strikingly illustrated in these examples, and it is obvious the somewhat higher absorption of the aromatic fuel blend favorably compares with many polymerized 2-chlorbutadiene compounds.

EXAMPLE V

As an example illustrating the use of other plasticizers than octadecane nitrile in the butadiene acrylonitrile copolymer-extender blends, the following is submitted:

| | |
|---|---|
| Butadiene acrylonitrile copolymer synthetic rubber | 100.00 |
| Soft coal tar (140° F. M. P.) | 3.00 |
| Zinc oxide | 10.00 |
| Sulfur | 1.00 |
| Benzothiazyl disulfide | 1.00 |
| Trimethyl dihydroquinoline | 1.00 |
| Semi-reinforcing black | 125.00 |
| Reclaim extender "A" | 50.00 |
| Dibutyl phthalate | 40.00 |

The ⅛" press cured slabs, 45 minutes at 331°, gave the following results:

| | Hardness | Tensile | Elongation | Recovery | Percent change | |
|---|---|---|---|---|---|---|
| | | | | | Weight | Volume |
| Originals | 68 | 1,560 | 300 | 112 | | |
| Kerosene, 48 hrs. at 70° C. | 80 | 1,210 | 130 | 106 | −8.6 | −6.2 |
| 100 octane fuel, 48 hrs. room temperature | 75 | 1,370 | 250 | 112 | −0.4 | −0.0 |
| Aromatic fuel blend fuel, 48 hrs. room temperature | 65 | 1,120 | 150 | 112 | +4.5 | +0.9 |

EXAMPLE VI

The influence of high and low plasticizer content is shown in the following two compounds which further illustrate the utility of the reaction:

| | "A" | "B" |
|---|---|---|
| Butadiene acrylonitrile copolymer synthetic rubber | 100.00 | 100.00 |
| Soft coal tar (140° F. M. P.) | 3.00 | 3.00 |
| Zinc oxide | 10.00 | 10.00 |
| Benzothiazyl disulfide | 1.50 | 1.50 |
| Trimethyl dihydroquinoline | 1.00 | 1.00 |
| Sulfur | 2.50 | 2.50 |
| Semi-reinforcing black | 75.00 | 75.00 |
| Reclaim extender "A" | 100.00 | 100.00 |
| Octadecane nitrile | 30.00 | 50.00 |

⅛" slabs vulcanized 45 minutes at 331° F. give the following results:

| | Hardness | Tensile | Elongation | Recovery | Percent change | |
|---|---|---|---|---|---|---|
| | | | | | Weight | Volume |
| Originals: | | | | | | |
| "A" | 61 | 1,140 | 240 | 106 | | |
| "B" | 48 | 950 | 310 | 106 | | |
| SAE oil "A" 48 hours at 212° F. | 70 | 1,350 | 200 | 106 | −7.4 | −9.7 |
| "B" | 61 | 1,080 | 260 | 106 | −12.3 | −18.8 |
| Light process oil "A" 48 hours at 212° F. | 65 | 1,420 | 220 | 106 | −2.7 | −3.6 |
| "B" | 58 | 1,050 | 270 | 106 | −6.0 | −8.9 |
| Kerosene "A" 48 hours at 212° F. | 60 | 1,210 | 220 | 106 | −0.5 | +1.1 |
| "B" | 55 | 900 | 260 | 106 | −4.1 | −3.6 |
| 100 octane fuel "A" 48 hrs. room temperature | 60 | 1,020 | 200 | 103 | +2.1 | +4.9 |
| "B" | 55 | 670 | 230 | 103 | +2.0 | +4.9 |
| Aromatic fuel blend fuel "A" 48 hours room temperature | 60 | 840 | 190 | 103 | +3.8 | +0.9 |
| "B" | 50 | 580 | 210 | 103 | +2.7 | +9.2 |

In examining the resistance of the various extenders, it will be noticed that the crude rubber extenders while evidencing fairly good resistance against hot petroleum derivatives, notably kerosene, nevertheless are inferior in behavior to the treated reclaims when blended with butadiene acrylonitrile copolymer synthetic rubber, notably against the aromatic fuel base mixture consisting of 60% 65 octane gasoline, 15% xylol, 20% toluol, and 5% benzol. However, it is apparent from the above examples that crude rubber compositions may be used in my invention and give advantageous results when mixed and compounded as illustrated.

While there have been shown and described certain embodiments of the invention, it is understood it is capable of many modifications. As an example, the use of diphenyl guanidine can be substituted molecular equivalent for molecular equivalent of the triphenyl guanidine without appreciably affecting the results. Similarly other substituted guanidines such as diotolyl guanidine and others have been successfully utilized. In addition the sulfur and substituted guanidines can be fused or melted together to form admixtures or complexes as shown in my co-pending application Serial No. 415,776 and after milling into the reclaims as described, offer essentially similar results.

In contrast to the behavior of octadecane nitrile in ordinary compounding technique as practised with the Hycar butadiene acrylonitrile compositions, the additions of amounts exceeding 25% by weight on the polymer have no adverse effect on the cure whenever the reclaim or crude rubber extenders are also incorporated into the butadiene acrylonitrile copolymer synthetic rubber. As is well known, octadecane nitrile in excess of 25% of the butadiene acrylonitrile copolymer weight, such polymer containing the usual 1% to 1.5% sulfur will not vulcanize thoroughly as the cure is then definitely retarded. In the presence of these extenders no such adverse effect is noted so far as the oil resistance is concerned.

EXAMPLE VII

The extenders themselves are utilizable for substitutes for the more expensive synthetics whenever the cost and service factor mitigates against the use of the more costly butadiene acrylonitrile copolymers, the polymerized 2-chlorobutadienes and the butyl rubbers. In addition they excel in solvent resistance these products proposed as substitutes for the more costly polymers, such as the polyesters derived from soy bean oil.

The utility of reclaim extender "A" and crude rubber extender "C" as compositions suitable for service of this type are shown in the following comparison of reclaim extender "A" and crude rubber extender "B."

*48 hour test 100 octane aviation fuel*

| | Hardness | Tensile | Elongation | Recovery | Weight | Volume |
|---|---|---|---|---|---|---|
| Reclaim extender "A" | 55 | 320 | 170 | 107 | +1.01 | +1.04 |
| Crude rubber extender "C" | 75 | 790 | 190 | 118 | +0.4 | +1.3 |

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

Throughout this specification the amounts of materials given in the examples are parts by weight unless otherwise noted. The tensile strengths are in pounds per square inch, the hardness is shore hardness, and the elongation is in percent.

I claim:

1. The composition of claim 2 in which the rubber and sulfur are combined by vulcanization.

2. A composition comprising reclaimed vulcanized natural rubber, octadecane nitrile, sulfur, triphenyl guanidine, and a butadiene-acrylonitrile synthetic rubber, the sulfur being present in at least 20% and not above 23.7% by weight of the natural rubber hydrocarbon, the triphenyl guanidine being present in from three to five molecule equivalents by weight on the sulfur, the octadecane nitrile being present in from 15% to 50% on the hydrocarbon value of the natural rubber, and the natural rubber being present in not less than 28.7% by weight of the composition excluding the synthetic rubber.

3. A composition of matter particularly adapted for use as an extender for oil resistant butadiene acrylonitrile synthetic rubber, said composition comprising natural rubber, octadecanenitrile, sulfur, and an aryl guanidine selected from the group consisting of diphenyl guanidine, triphenyl guanidine and diorthotolyl guanidine, the sulfur being present in at least 20% and not more than 23.7% by weight of the rubber, the aryl guanidine being present in between three to five molecule equivalents of the sulfur, the octadecanenitrile being present in from 15% to 50% of the hydrocarbon value of the rubber, and the rubber being present in not less than 28.7% by weight of the composition.

JOHN H. KELLY, JR.

REFERENCES CITED

The following references are of record in the file of this patent:

UNITED STATES PATENTS

| Number | Name | Date |
|---|---|---|
| 2,080,910 | Coons | May 18, 1937 |
| 2,088,920 | Pickett | Aug. 3, 1937 |
| 2,271,125 | Juve | Jan. 27, 1942 |
| 2,287,773 | Bacon, et al. | June 30, 1942 |
| 2,319,634 | Sauser | May 18, 1943 |
| 2,381,248 | Bascom | Aug. 7, 1945 |